(12) United States Patent
Lincoln et al.

(10) Patent No.: US 12,631,268 B2
(45) Date of Patent: *May 19, 2026

(54) SYSTEMS, METHODS AND APPARATUS FOR MINE SLOPE EXTRACTION

(71) Applicant: Southwest Leaching Technologies, LLC, Pearce, AZ (US)

(72) Inventors: Kyle Lincoln, Wilcox, AZ (US); Frank Duran, Wilcox, AZ (US)

(73) Assignee: Southwest Leaching Technologies, LLC, Pearce, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,940

(22) Filed: Jun. 13, 2024

(65) Prior Publication Data

US 2025/0043885 A1    Feb. 6, 2025

Related U.S. Application Data

(63) Continuation of application No. 18/533,529, filed on Dec. 8, 2023, now Pat. No. 12,013,057, which is a
(Continued)

(51) Int. Cl.
*F16L 1/024* (2006.01)
*B05B 1/20* (2006.01)
(Continued)

(52) U.S. Cl.
CPC .............. *F16L 1/0243* (2013.01); *B05B 1/20* (2013.01); *B05B 13/0278* (2013.01); *C22B 3/02* (2013.01);
(Continued)

(58) Field of Classification Search
CPC ......... F16L 1/0243; F16L 1/0246; F16L 3/01; F16L 3/012; F16L 3/015; F16L 3/14;
(Continued)

(56) References Cited

U.S. PATENT DOCUMENTS 1,165,277 A * 12/1915 Munson ............... B65H 75/403
                                                      242/388.6
1,244,465 A * 10/1917 Braly .................. F24F 13/0254
                                                      285/61
(Continued)

FOREIGN PATENT DOCUMENTS

WO      1993022063 A1    11/1993
WO      2014100858 A1    7/2014

OTHER PUBLICATIONS

Office Action from related Brazilian Appln. No. BR 11 2023 025821-9, dated Jul. 16, 2024. English translation attached. 3 pages.
(Continued)

*Primary Examiner* — William M Mccalister
(74) *Attorney, Agent, or Firm* — Secant IP, PLLC

(57)    ABSTRACT

The present disclosure provides a system for vertical deployment of leaching lines onto a slope of a mine leach pad. The system includes an elevated guidewire having a first end disposed at a top of the slope and a second end disposed at a bottom of the slope; the elevated guidewire being elevated above a surface of the slope; a deployment apparatus moveably coupled to the elevated guidewire and having one or more attachment mechanisms disposed thereon; and one or more leaching lines coupled to the attachment mechanisms; wherein movement of the deployment mechanism from the top of the slope to the bottom of the slope pulls the one or more leaching lines down the slope and deploys the one or more leaching lines vertically onto the surface of the slope.

7 Claims, 5 Drawing Sheets

Related U.S. Application Data continuation of application No. PCT/US2022/032368, filed on Jun. 6, 2022.

(60) Provisional application No. 63/208,383, filed on Jun. 8, 2021.

(51) Int. Cl.

| | |
|---|---|
| *B05B 13/02* | (2006.01) |
| *C22B 3/02* | (2006.01) |
| *C22B 3/08* | (2006.01) |
| *F16L 1/028* | (2006.01) |
| *F16L 1/06* | (2006.01) |
| *F16L 3/01* | (2006.01) |
| *F16L 3/18* | (2006.01) |

(52) U.S. Cl.
CPC ............... *C22B 3/08* (2013.01); *F16L 3/012* (2013.01); *F16L 3/18* (2013.01); *F16L 1/028* (2013.01); *F16L 1/06* (2013.01)

(58) Field of Classification Search
CPC ..... F16L 3/16; F16L 3/18; F16L 1/028; F16L 1/06; B05B 13/0278; B05B 1/20; C22B 3/02; C22B 3/08
USPC .......... 248/58, 59, 60, 61, 62, 63; 137/15.09
See application file for complete search history.

(56) References Cited

U.S. PATENT DOCUMENTS

| | | | | | |
|---|---|---|---|---|---|
| 1,454,864 | A | * | 5/1923 | Schaake | H02G 7/05 248/63 |
| 1,671,706 | A | * | 5/1928 | Evans | E21F 1/04 248/62 |
| 1,833,704 | A | * | 11/1931 | Bins | E21F 1/04 248/61 |
| 2,570,573 | A | * | 10/1951 | Liboiron | A01G 25/095 239/735 |
| 2,721,050 | A | * | 10/1955 | Sams | F16L 3/00 248/62 |
| 2,804,095 | A | * | 8/1957 | Schauenburg | E21F 1/04 454/168 |
| 3,446,235 | A | * | 5/1969 | Linderman | A01G 25/095 239/748 |
| 3,516,609 | A | * | 6/1970 | Gheen | A01G 25/09 239/734 |
| 3,776,141 | A | * | 12/1973 | Gelhard | E01B 25/00 104/138.1 |
| 3,809,430 | A | * | 5/1974 | Michaelson | E21C 41/26 299/5 |
| 3,895,644 | A | * | 7/1975 | Umphrey | F16L 3/18 137/355.16 |
| 4,017,309 | A | * | 4/1977 | Johnson | C22B 3/06 299/5 |
| 4,069,765 | A | * | 1/1978 | Muller | E01B 25/16 404/1 |
| 4,625,631 | A | * | 12/1986 | Vera | E21F 17/02 138/107 |
| 5,005,606 | A | * | 4/1991 | Carroll | D03J 1/00 134/1 |
| 5,005,806 | A | | 4/1991 | Krauth | |
| 5,226,456 | A | | 7/1993 | Semak | |
| 5,240,503 | A | | 8/1993 | Levy et al. | |
| 5,256,002 | A | * | 10/1993 | Shimizu | H02G 1/08 248/68.1 |
| 5,655,457 | A | * | 8/1997 | Sherman | E01B 25/16 14/18 |
| 6,009,956 | A | * | 1/2000 | Krieg | C22B 3/04 172/438 |
| 6,216,962 | B1 | * | 4/2001 | Krieg | C22B 3/02 239/736 |
| 6,360,669 | B1 | | 3/2002 | Albrich | |
| 6,655,641 | B2 | * | 12/2003 | Sherman | E02D 29/067 248/58 |
| 8,801,327 | B2 | * | 8/2014 | Johnson | B63B 21/56 405/63 |
| 10,189,484 | B2 | | 1/2019 | Grip | |
| 10,604,163 | B2 | * | 3/2020 | Souchal | B61B 7/00 |
| 12,013,057 | B2 | * | 6/2024 | Lincoln | C22B 3/02 |
| 2003/0000414 | A1 | * | 1/2003 | Sherman | E01D 18/00 104/112 |
| 2008/0121399 | A1 | | 5/2008 | Zupanick | |
| 2011/0274599 | A1 | * | 11/2011 | Hughes | C01D 7/12 423/208 |
| 2013/0125709 | A1 | | 5/2013 | Morrow et al. | |
| 2015/0346374 | A1 | * | 12/2015 | Campbell | G01V 3/20 324/366 |

OTHER PUBLICATIONS

International Preliminary Report on Patentability from corresponding PCT Appln. No. PCT/US2022/032368, dated Nov. 21, 2023. 6 pages.
International Search Report and Written Opinion from corresponding PCT Appln. No. PCT/US2022/032368, dated Oct. 12, 2022. 7 pages.
Bester, et al. "Reconciliation of the Mining Value Chain-Mine to Design as a Critical Enabler for Optimal and Safe Extraction of the Mineral Reserve." Journal of the Southern African Institute of Mining and Metallurgy vol. 116, pp. 407-411. May 2016.

* cited by examiner

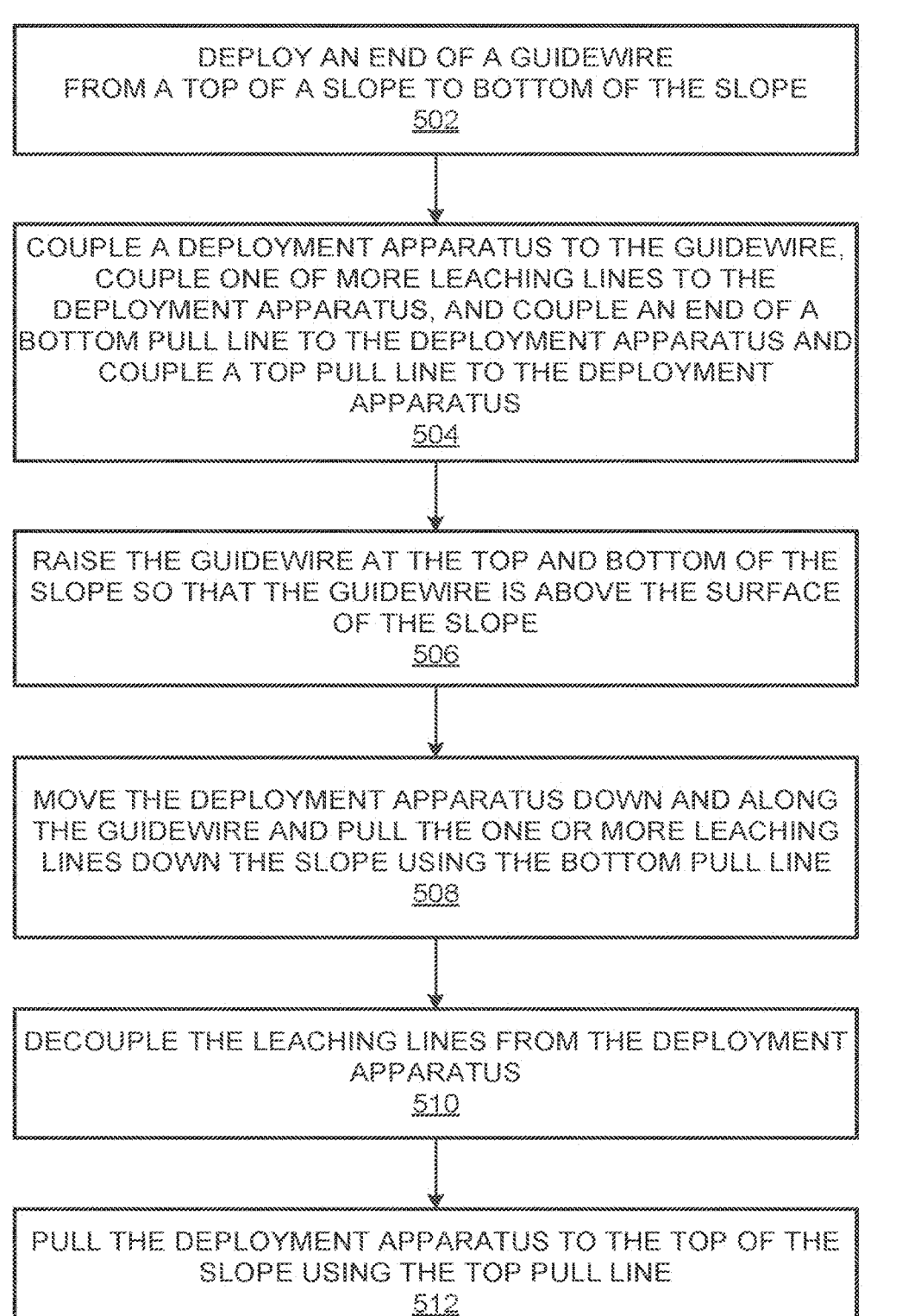

— 500

DEPLOY AN END OF A GUIDEWIRE
FROM A TOP OF A SLOPE TO BOTTOM OF THE SLOPE
502

COUPLE A DEPLOYMENT APPARATUS TO THE GUIDEWIRE,
COUPLE ONE OF MORE LEACHING LINES TO THE
DEPLOYMENT APPARATUS, AND COUPLE AN END OF A
BOTTOM PULL LINE TO THE DEPLOYMENT APPARATUS AND
COUPLE A TOP PULL LINE TO THE DEPLOYMENT
APPARATUS
504

RAISE THE GUIDEWIRE AT THE TOP AND BOTTOM OF THE
SLOPE SO THAT THE GUIDEWIRE IS ABOVE THE SURFACE
OF THE SLOPE
506

MOVE THE DEPLOYMENT APPARATUS DOWN AND ALONG
THE GUIDEWIRE AND PULL THE ONE OR MORE LEACHING
LINES DOWN THE SLOPE USING THE BOTTOM PULL LINE
508

DECOUPLE THE LEACHING LINES FROM THE DEPLOYMENT
APPARATUS
510

PULL THE DEPLOYMENT APPARATUS TO THE TOP OF THE
SLOPE USING THE TOP PULL LINE
512

FIG. 5

SYSTEMS, METHODS AND APPARATUS FOR MINE SLOPE EXTRACTION

This is a continuation of U.S. patent application Ser. No. 18/533,529 filed Aug. 12, 2023, which was a Continuation of PCT Application PCT/US22/32368 filed 6-6-2022, and claims the benefit of U.S. Provisional Application Ser. No. 63/208,383, filed 8-6-2021, all of which are hereby incorporated by reference in their entirety.

TECHNICAL FIELD

The present disclosure relates to systems, methods and apparatus for mine slope extraction.

BACKGROUND

Open-pit mines are in operation throughout the world to enable mining of precious and/or industrial minerals such as copper, gold, silver, platinum, etc. Earth material is extracted from the mine and placed on vast leach pads, typically adjacent the open pit of the mine. FIG. 1 illustrates a cross-sectional view of a typical leach pad 100 used in open-pit mining operations. The leach pad 100 is formed of successive layers 102, 104, 106 of earth material extracted from the mine. Initially, layer 102 is deposited on a leach field. The top surface of layer 102 is leached for minerals, where extraction of minerals usually involves deployment of leaching lines (e.g., drip lines) on the top of the leach pad to soak the extracted earth material with an acidic solution (e.g., sulfuric acid solution) to dissolve the minerals, thus forming a mineral-rich slurry (e.g., pregnant leaching solution) below the layer 102. The slurry may then be collected beneath the leach pad, and the dissolved minerals may be recovered from the slurry using known recovery processes. The slope section 101 of the layer 102 is typically not leached. Subsequent layers 104, 106, etc. are deposited on top of the previous layer and leached for minerals. Slopes 103, 105, etc. are additively formed with each subsequent layer, thus forming a large slope region 110. Since only the area beneath the top of each pad is leached for minerals, an increasing area 112 beneath the slope 110 is developed. In a typical mining operation, the leaching pads may grow to heights of several hundred feet (or more), with a slope (area of repose) formed around the perimeter of the leach pad. As the leach pad gets taller, the slope generally gets longer, and potentially steeper. In conventional mining techniques, deployment of leaching lines along the slope 110 of the leach pad is both hazardous and inefficient, and usually avoided. Thus, minerals are often not extracted from mine slopes, leaving a large amount of minerals that remain unrecovered.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5 is a flowchart of operations for vertical deployment of leaching lines along a slope of a leach pad according to various embodiments of the present disclosure.

Figure 1:
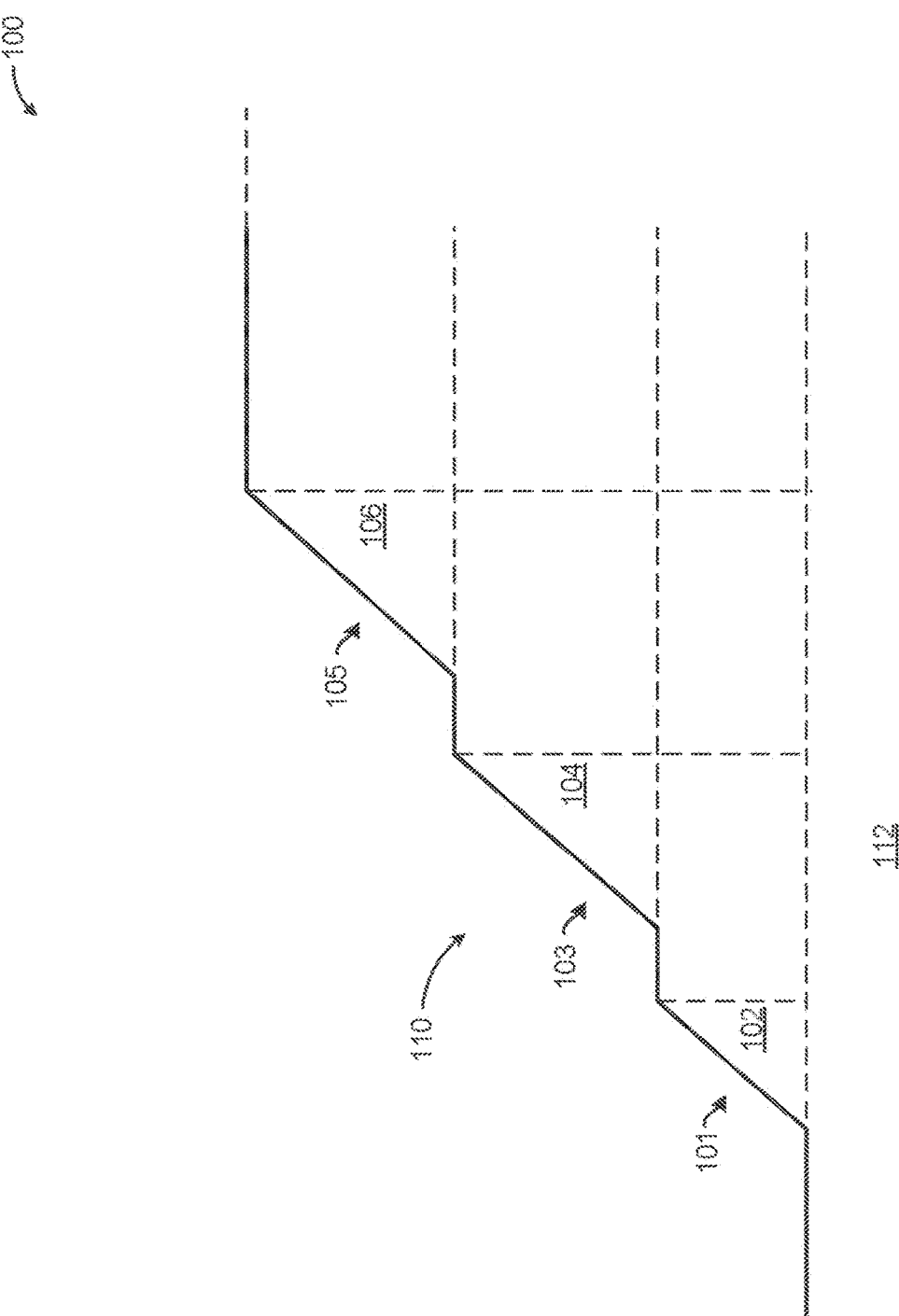
FIG. 1 illustrates a cross-sectional view of a typical leach pad used in open-pit mining operations.

Although the following Detailed Description will proceed with reference being made to illustrative embodiments, many alternatives, modifications and variations thereof will be apparent to those skilled in the art.

DETAILED DESCRIPTION

Accordingly, the present disclosure provides systems, methods and apparatus to deploy vertical leaching lines on a slope of a leach pad. The systems, methods and apparatus of the present disclosure enables recovery of minerals that exist beneath the mine slope surface, thus significantly increasing the monetization of the mine per square of open pit. In addition, the systems, methods and apparatus of the present disclosure enables slope mineral recovery with enhanced safety features that permit workers to vertically deploy leaching lines on slopes that would otherwise be too inaccessible and unsafe to allow workers. "Vertical" and "vertical deployment" as used herein, means the systems and apparatus are deployed to deliver leaching lines along the slope from the top of the slope to the bottom of the slope, rather than horizontally along the slope.

The system of the present disclosure generally includes an elevated guidewire that is elevated above the slope of a mine, having a first end at a top rim of a slope and second end at the bottom of the slope. The elevated guidewire generally runs substantially vertically from the top rim of the slope to the bottom of a bench or floor of the mine. One end of the elevated guidewire may initially be delivered from the top rim of the slope to the bottom of a bench or floor of the mine using conventional "human" techniques such as repelling down the slope, etc. and/or mechanical delivery systems such as "bow and arrow" systems, catapult systems, etc. Once the guidewire is in place vertically along the slope, the guidewire is elevated by raising each end of the guidewire using conventional elevations systems such as a boom crane, boom form, etc., positioned at the top and bottom of the slope, to raise the guidewire above the surface of the slope (and generally parallel to the surface of the slope). The first end and second end of the guidewire, once elevated, may be fixed at both the top and bottom of the slope having sufficient tension to safely support the weight of one or more leaching lines and deployment apparatus, described below.

The system of the present disclosure also includes a leaching line deployment apparatus moveably coupled to the guidewire. The leaching line deployment apparatus is generally configured to vertically deliver one or more leaching lines to the surface of the slope. The leaching line deployment apparatus generally include a first section that is coupled to the guidewire using, for example, a pulley so that the leaching line deployment apparatus can move up and down the slope riding on and along the length of the guidewire. The leaching line deployment apparatus also includes a second section, coupled to first section, having at least one holding mechanism to hold one or more leaching lines on the second section. The holding mechanisms may be substantially equally spaced along the second section so that leaching lines coupled to the holding mechanisms are placed along the slope in a generally equidistant manner. One or more weights may be coupled to the leaching line deployment apparatus to facilitate gravity operation of the leaching line deployment apparatus, as described below.

In operation, one or more leaching lines are coupled to the leaching line deployment apparatus at the rim of the slope. The leaching line deployment apparatus is then gravity-fed down the elevated guidewire, pulling down the one or more leaching lines along with the leaching line deployment apparatus. Once at the bottom of the slope, the one or more leaching lines are decoupled from the leaching line deployment apparatus, and the leaching line deployment apparatus may be pulled back up to the rim of the slope to repeat the process with additional leaching line(s). Accordingly, the system of the present disclosure also includes a first pull line, coupled to the leaching line deployment apparatus, to pull the leaching line deployment apparatus from the bottom of the slope to the top of the slope. The first pull line may be coupled to a drawing/release apparatus such as a winch, etc. positioned near the rim of the slope. The winch may be placed in a "neutral" status to allow the leaching line deployment apparatus to pull the first line down as it is running down the slope along the guidewire. The winch may then be engaged to pull the leaching line deployment apparatus up the slope. In some embodiments, the winch may also include emergency breaking, etc. to prevent the leaching line deployment apparatus from going down the slope too quickly. In some embodiments, the system may also include a second pull line, coupled to the leaching line deployment apparatus, to pull the leaching line deployment apparatus from the top of the slope to the bottom of the slope. The first pull line may be coupled to a drawing/release apparatus such as a winch, etc. positioned near the bottom of the slope. The second pull line may be used, for example, if the leaching line deployment apparatus gets "stuck" along the length of the guidewire and/or to assist movement of the leaching line deployment apparatus down the slope.

The one or more leaching lines may be standard and/or custom and/or proprietary leaching lines that are employed in mining environment. A leaching line may include a plurality of tubing segments coupled together by a plurality flow limiters/valves. The tubing segments include emitter holes/pores to deliver a leaching solution to the soil surface of the mine. The valves may generally be spaced apart to prevent excessive pressure from developing along the leaching line, and to enable flow control of the leaching solution.

Figure 2:
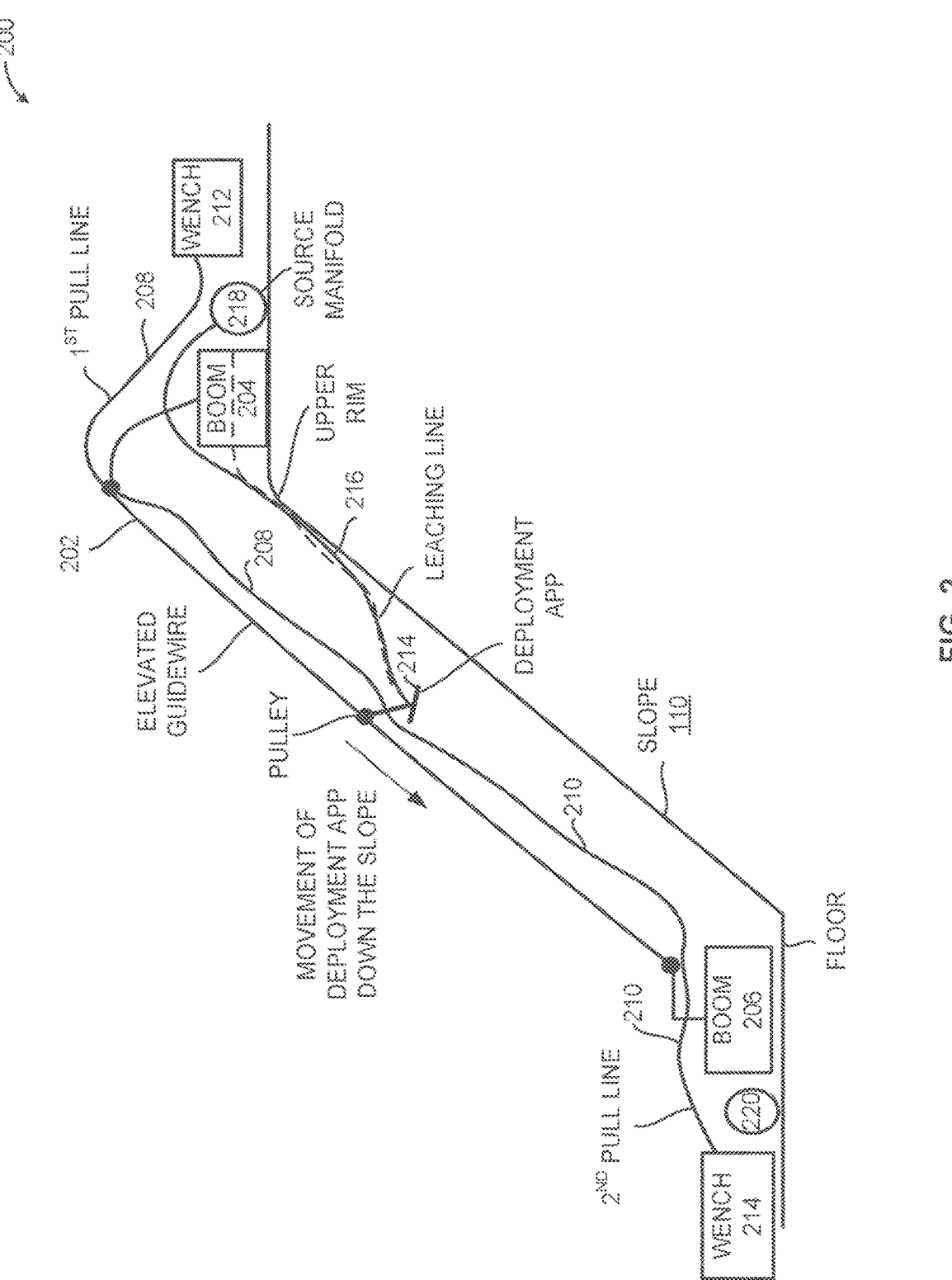
FIG. 2 illustrates a system to deploy one or more leaching lines along a slope of a leach pad according to several embodiments of the present disclosure.

FIG. 2 illustrates a system 200 to deploy one or more leaching lines along a slope of a leach pad according to several embodiments of the present disclosure. The system 200 is illustrated in FIG. 2 in reference to a cross-sectional view of a leach pad (similar to FIG. 1). As shown in FIG. 2, an elevated guidewire 202 is deployed above a leach pad slope 110. In one example embodiment, guidewire 202 may be suspended between a top boom apparatus (or similar) 204 deployed adjacent the upper rim of the slope 110 and a bottom boom apparatus 206 (or similar) deployed adjacent the bottom of the slope 110. The diameter and/or tensile strength of the guidewire 202 may be selected based on, for example, the anticipated weight to be supported by the guidewire 202, the overall length of the slope 110, etc. In some embodiments, the guidewire 202 may be selected from among hardened steel, stainless steel, and/or metal amalgams of sufficient strength for a given operating environment. In addition, the guidewire 202 may be suspended between the top boom 204 and bottom boom 206 with a selected tension based on, for example, the anticipated weight to be supported by the guidewire 202, the overall length of the slope 110, safety parameters, etc.

A deployment apparatus 214 is movably coupled to the guidewire 202, and one or more leaching lines 216 are coupled to the deployment apparatus 214. The deployment apparatus 214 is sent down along the length of the guidewire 202, pulling one or more leaching line(s) 216 coupled to the deployment apparatus 214 down the slope 110. Thus, and as described below, the deployment apparatus 214 may be coupled to the guidewire 202 using a pulley and/or other rolling mechanisms to provide relatively free movement of the deployment apparatus 214 along the length of the guidewire 202.

The system 200 also includes a top pull line 208 coupled to the deployment apparatus 214 on one end thereof and a top wench 212 on the other end thereof. Once the deployment apparatus 214 reaches the bottom of the slope, the top pull line 208 pulls the deployment apparatus 214 back up the slope 110 along the guidewire 202. The system 200 may also include a bottom pull line 210 coupled to the deployment apparatus 214 on one end thereof and a bottom wench 214 on the other end thereof. The bottom pull line 210 may be used to pull the deployment apparatus 214 toward the bottom of the slope 110, via bottom wench 214.

At the top of the slope 110, the one or more leaching line(s) 216 are coupled to the deployment apparatus 214. Once the deployment apparatus 214 reaches the bottom of the slope 110, the one or more leaching line(s) 216 may be decoupled from the deployment apparatus 214, and the top pull line 208 may be drawn upward (via top wench 212) to draw the deployment apparatus 214 to the top of the slope 110 along the guidewire. Thus, the length of the top and bottom pull lines 208, 210 are selected to enable free travel of the deployment apparatus 214 from the top of the slope 110 to the bottom of the slope 110. The one or more leaching lines 216 may be coupled to, for example, a leaching fluid source manifold 218 at the top of the slope 110 and/or a drainage/cleanout manifold 220 at the bottom of the slope 110. The source manifold 218 provides leaching solution to the one or more leaching line(s) 216. Once the one or more leaching line(s) 216 are delivered to the bottom of the slope 110, the top and bottom booms 204, 206 slope may be moved laterally along the upper rim of the slope 110 and the lower rim of the slope 110 (e.g., into or out of the page of FIG. 2), and the process described above may be repeated to deploy additional leaching line(s).

Figure 3:
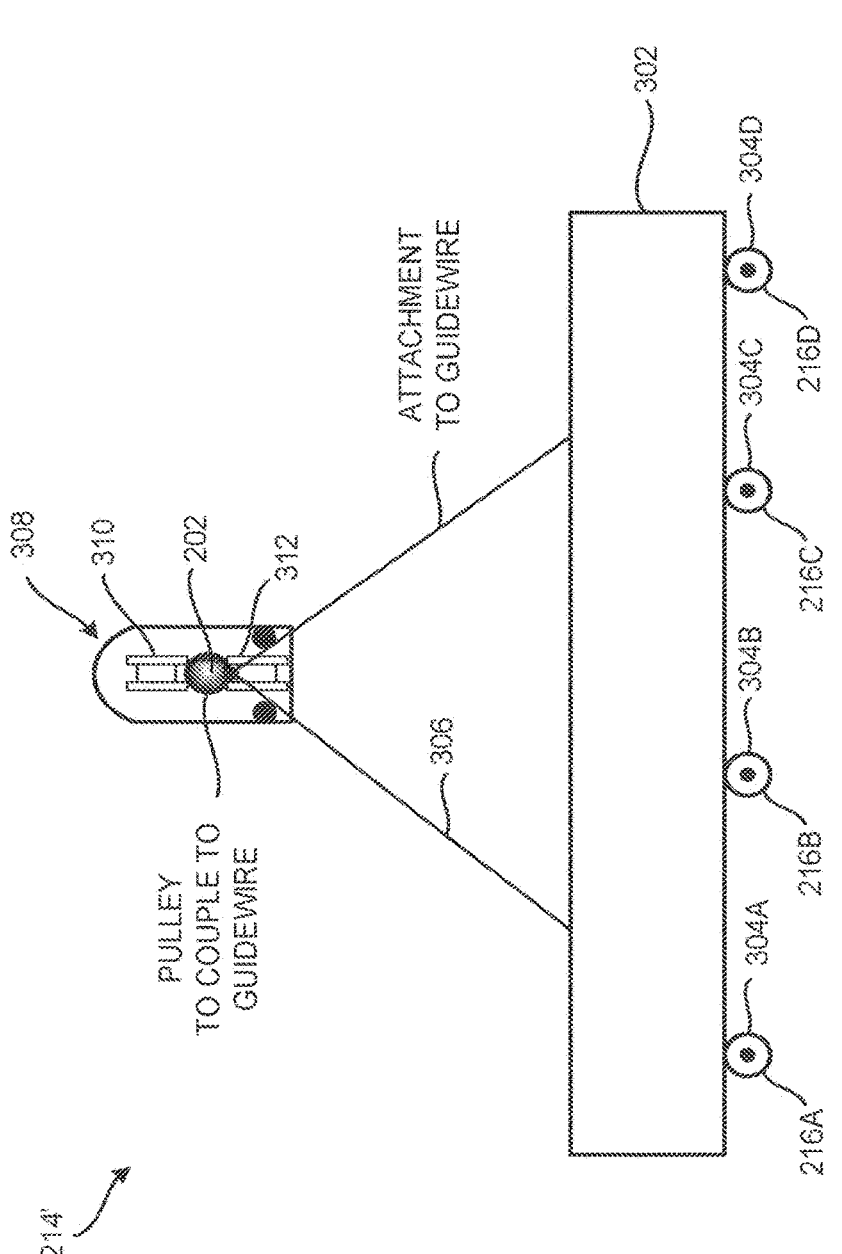
FIG. 3 illustrates an example deployment apparatus according to one embodiment of the present disclosure.

FIG. 3 illustrates an example deployment apparatus 214' according to one embodiment of the present disclosure. The deployment apparatus 214' of this embodiment is for the deployment of up to four leaching lines for each top to bottom traversal of the slope 110. The deployment apparatus 214' of this embodiment includes a crossbar member 302 that includes an attachment mechanism for a plurality of leaching line 216A, 216B, 216C and 216D. In this example, the attachment mechanism includes a plurality of rings and/or notches and/or slots 304A, 304B, 304C and 304D disposed along the bottom surface of the crossbar member 304. Each of the plurality of rings, notches and/or slots 304A, 304B, 304C and 304D are generally sized to couple to a respective leaching line 216A, 216B, 216C and 216D, so that the leaching lines 216A, 216B, 216C and 216D can be pulled down the slope 110. For example, a leaching lines 216A, 216B, 216C and 216D may be friction-fit into a respective ring, notch and/or slot 304A, 304B, 304C and 304D and/or tied off, etc., so that the leaching line 216A, 216B, 216C and 216D remains securely coupled to the deployment apparatus 214' while travelling along the slope 110. The plurality of rings and or notches 304A, 304B, 304C and 304D may be evenly disposed along the length of the crossbar member 302 to facilitate equally-spaced placement of leaching lines 216A, 216B, 216C and 216D on the slope 110. The spacing of the rings, notches and/or slots 304A, 304B, 304C and 304D may be selected based on a desired flow rate/saturation of leaching fluid from the leaching lines 216A, 216B, 216C and 216D, for example as may be expressed in gallons/square foot/hour.

The deployment apparatus 214' a coupling mechanism 308 to couple the crossbar member 302 to the guidewire 202. In this example, the coupling mechanism 308 is a pulley that includes a plurality of rollers 310, 312 to provide free movement of the deployment apparatus 214' with respect to the guidewire 202. In some embodiments, the coupling mechanism 308 and/or guidewire 202 may be lubricated (e.g., grease, etc.) at regular service intervals to reduce and/or prevent frictional wear and/or binding of the coupling mechanism 308 and/or guidewire 202. One or more coupling member(s) 306 are provided to couple the coupling mechanism 308 to the crossbar member 302. In some embodiments, the crossbar member 302 may also include hooks and/or other attachment means (not shown) to enable attachment of weights to the crossbar member 302, which may facilitate greater case of motion down the guidewire 202.

Figure 4:
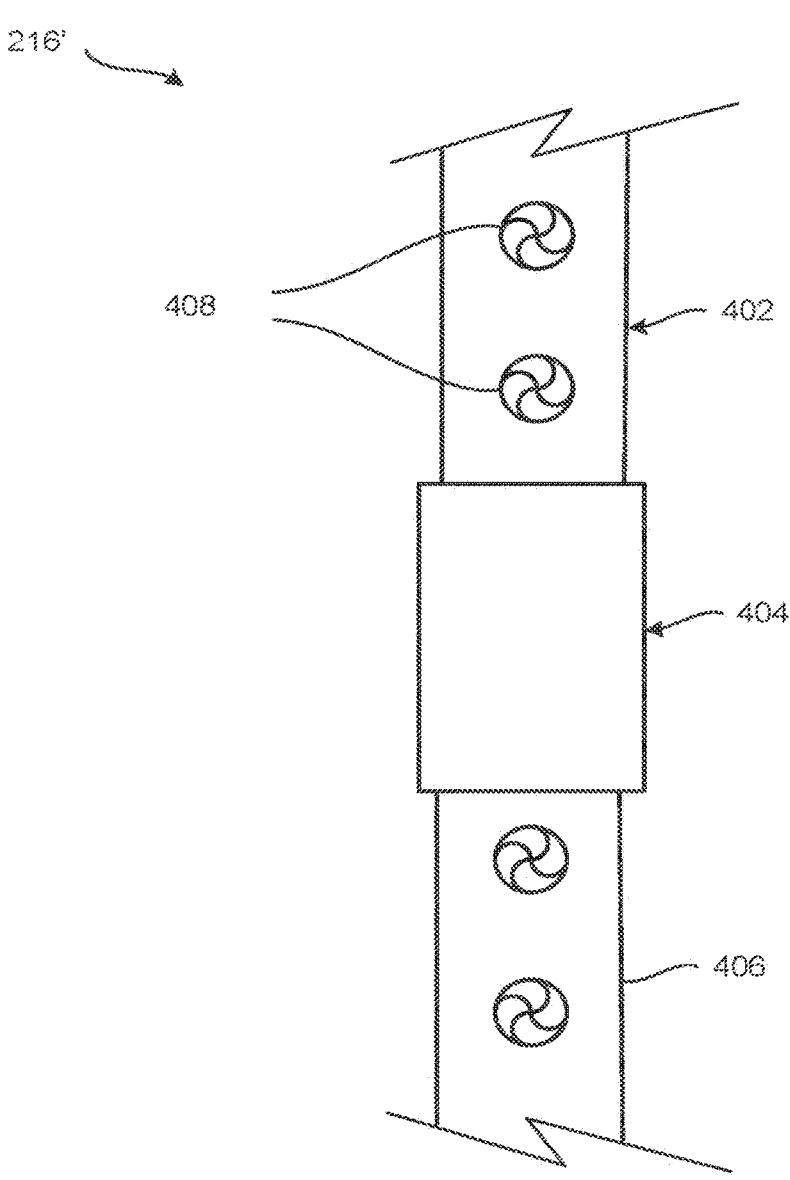
FIG. 4 illustrates a portion of an example leaching line according to one embodiment of the present disclosure.

FIG. 4 illustrates a portion of an example leaching line 216' according to one embodiment of the present disclosure. The leaching line 216' of this embodiment includes a plurality of sections of plastic tubing 402, 406 and one or more pressure regulators 404 disposed along the length of the leaching line 416', between sections of tubing 402, 404. The tubing may be selected to provide sufficient flow based on the number of emitters, required material (e.g. polyethylene resin material), specified diameter, etc. Since the leaching line 216' is to be disposed vertically along a slope 110, the pressure regulator 404 is selected so that each section 402, 406 is exposed to approximately the same pressure along the length of the leaching line 216'. For example, the pressure regulator 404 may be regulators specific for the mining industry, for example, regulators manufactured and sold by Senninger Mining Corp., and generally configured to provide 5 to 20 psi pressure regulation. The leaching line also includes a plurality of emitters 408 disposed along the length of the leaching line 216' to emit leaching fluid. Each emitter may be selected to provide a specific flow rate (e.g., gallons per hour) so that a desired saturation of leaching fluid (expressed in gallons/square foot/hour) is achieved. Thus, the number and spacing of the emitters 408 may be selected to achieve a desired leaching fluid saturation of the slope 110.

FIG. 5 is a flowchart 500 of operations for vertical deployment of leaching lines along a slope of a leach pad according to various embodiments of the present disclosure. Operations include deploying an end of a guidewire from a top of the slope to the bottom of the slope 502. Operations also include coupling a deployment apparatus to the guidewire, coupling one or more leaching lines to the deployment apparatus, and couple an end of a bottom pull line to the deployment apparatus, and couple an end of a top pull line to the deployment apparatus 504. These operations are typically performed at the top of the slope. Operations also include raising the guidewire at the top and bottom of the slope so that the guidewire is above the surface of the slope 506. Operations also include moving the deployment apparatus down and along the guidewire, from the top of the slope to the bottom of the slope, while pulling one or more leaching lines down the slope, using the bottom pull line 508. Once at the bottom, operations of this embodiment may also include decoupling the leaching lines from the deployment apparatus 510, thus deploying one or more leaching lines vertically on the slope. Operations may also include pulling the deployment apparatus to the top of the slope using the top pull line 212.

While FIG. 5 illustrate various operations according to one or more embodiments, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A system for vertical deployment of leaching lines onto a slope of a mine pad, comprising:
    a deployment apparatus moveably coupled to an elevated guidewire and having one or more attachment mechanisms disposed thereon; and
    one or more leaching lines coupled to the one or more attachment mechanisms; wherein movement of the deployment apparatus relative to the slope of the mine pad causes the deployment apparatus to deploy the one or more leaching lines vertically onto the surface of the slope.

2. The system of claim 1, wherein a leaching line comprises:
    a first section of tubing having a first plurality of emitters disposed thereon;
    a second section of tubing having a second plurality of emitters disposed thereon; and a pressure regulator disposed between the first section of tubing and the second section of tubing.

3. The system of claim 2, wherein the first and second plurality of emitters are each selected to provide a selected flow rate of leaching fluid.

4. The system of claim 3, wherein the leaching fluid is an acidic solution.

5. The system of claim 2, wherein the first plurality of emitters are spaced along the first section of tubing to provide a desired saturation rate of leaching fluid.

6. The system of claim 2, wherein the second plurality of emitters are spaced along the second section of tubing to provide a desired saturation rate of leaching fluid.

7. The system of claim 1, wherein the deployment apparatus includes a crossbar member and the attachment mechanism includes a plurality of rings and/or notches and/or slots disposed along the length of the crossbar member, wherein the plurality of rings and/or notches and/or slots disposed along the length of the crossbar member to releasably hold the one or more leaching lines.

* * * * *